May 3, 1938.   B. LOEFFLER   2,116,175
HYDRAULIC DIESEL AIR CHAMBER VALVE CONTROL MECHANISM
Filed Oct. 11, 1935   3 Sheets-Sheet 2
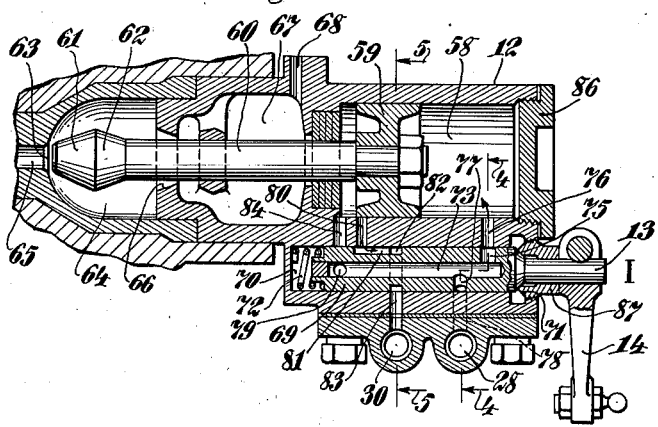
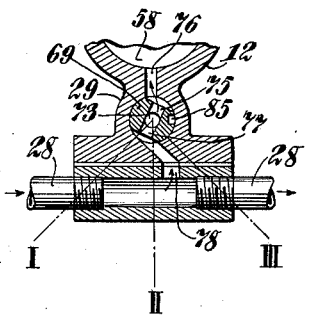
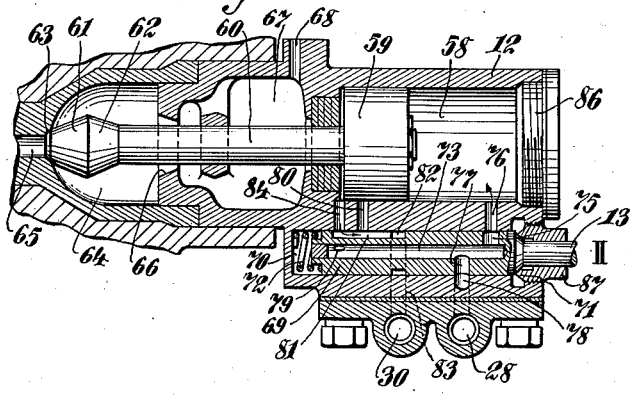
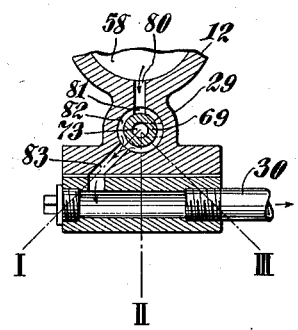
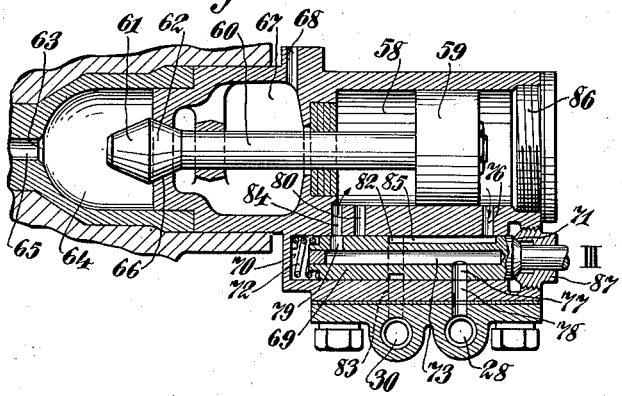
INVENTOR.
Bruno Loeffler,
BY Hoguet, Neary & Campbell
HIS ATTORNEYS

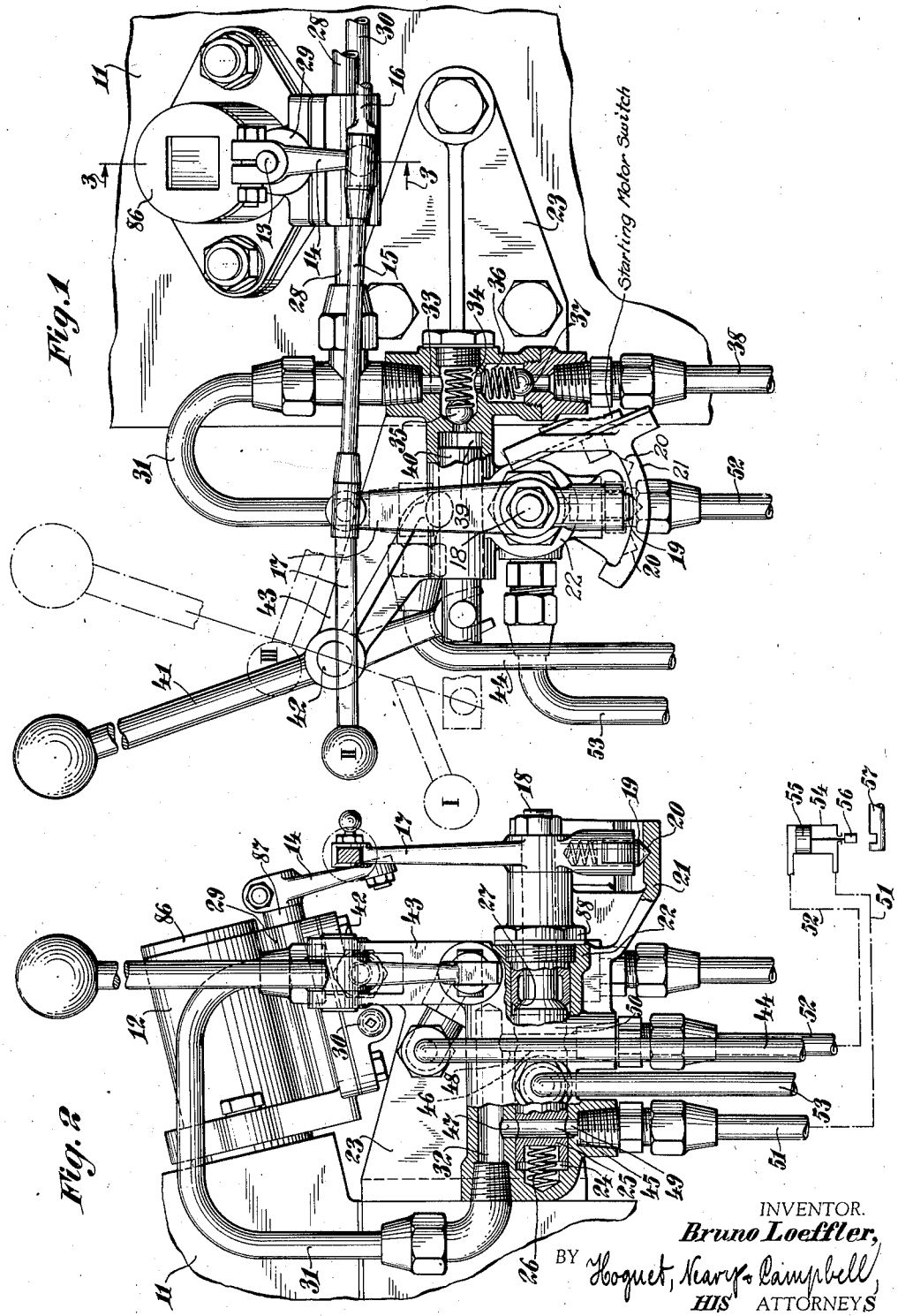

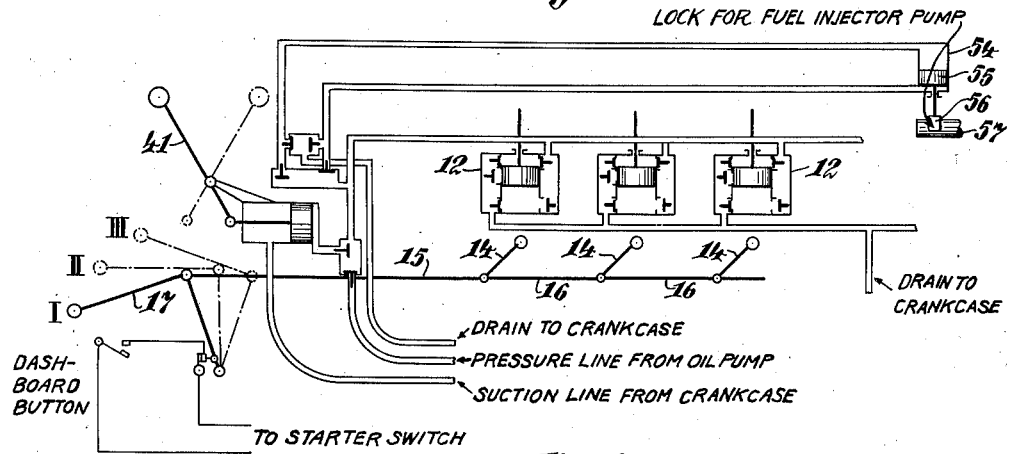
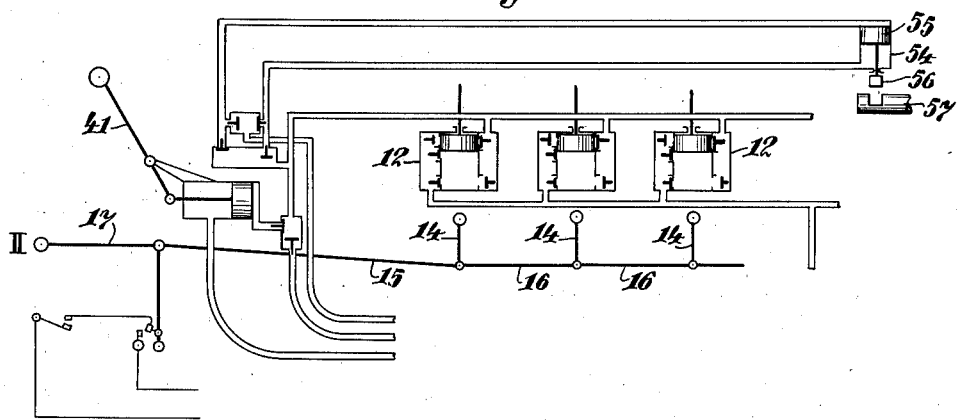
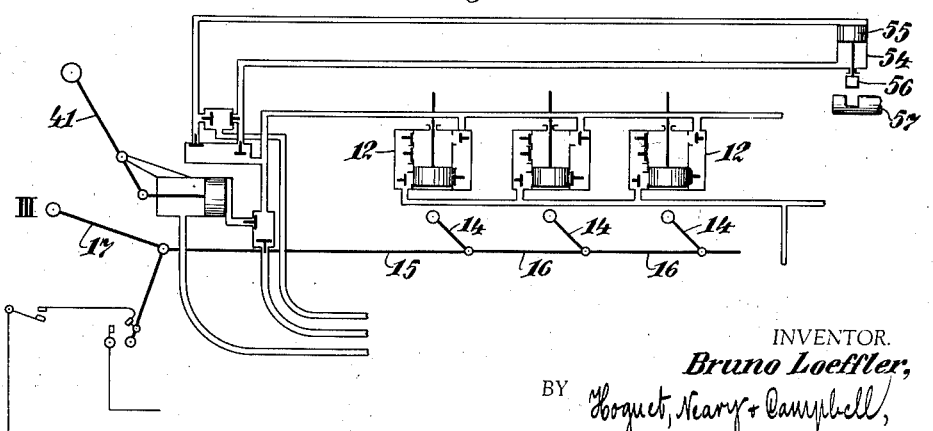

Patented May 3, 1938

2,116,175

UNITED STATES PATENT OFFICE 2,116,175

HYDRAULIC DIESEL AIR CHAMBER VALVE CONTROL MECHANISM

Bruno Loeffler, Plainfield, N. J., assignor to Mack Manufacturing Corporation, a corporation of Delaware Application October 11, 1935, Serial No. 44,507

4 Claims. (Cl. 123—182)

The present invention relates to air valve control mechanisms for Diesel engines and embodies, more specifically, fluid operating means by means of which the operation of such valves may be controlled. Certain types of Diesel engines employ air chambers which communicate with the combustion chambers of the respective engine cylinders, these air chambers being controlled, in operation, by means of valves which, by means of actuation into a plurality of positions, cause the air chamber to communicate with the combustion chamber during normal running operation of the engine, at which time communication of the air chamber with the atmosphere is prevented. During the cranking operation, the air chambers communicate with the atmosphere to cause decompression in the engine, thus facilitating the cranking operation. During the starting and idling operations of the engine, communication between the combustion chamber and air chamber is prevented in order to build up relatively great compression. Valves, by means of which these operations may be effected, are now known and the present invention seeks to provide an effective control mechanism by means of which one or more of such valves may be controlled from a remote station.

An object of the invention, accordingly, is to provide a control mechanism for one or more air chamber valves in a Diesel engine, such mechanism utilizing a fluid to transmit valve operating forces from a remote station to the valve or valves.

A further object of the invention is to provide a fluid operating mechanism for controlling a plurality of valves of the above character.

A further object of the invention is to provide a hydraulic mechanism by means of which a plurality of Diesel engine air valves may be effectively controlled.

A further object of the invention is to provide, in combination with a hydraulic system of the above character, means for providing an interlock with the fuel injector to prevent operation of the injector during cranking of the engine.

A further object of the invention is to provide a control mechanism of the above character wherein the moving parts are few and the application of power to the plurality of valves is effected positively and uniformly to each of the valves.

Further objects of the invention will be apparent as it is described in greater detail in connection with the accompanying drawings, wherein Figure 1 is a view in side elevation, partly broken away and in section, showing a portion of a Diesel engine upon which the present invention has been installed;

Figure 2 is a view in end elevation, partly broken away and in section, showing the mechanism of Figure 1;

Figure 3 is a view in section, taken on line 3—3 of Figure 1, and looking in the direction of the arrows, this view illustrating the valve and valve operating mechanism in position No. 1, which is the position of the parts during cranking operation of the engine;

Figure 4 is a view in section, taken on line 4—4 of Figure 3 and looking in the direction of the arrows;

Figure 5 is a view in section, taken on line 5—5 of Figure 3, and looking in the direction of the arrows;

Figure 6 is a view similar to Figure 3, showing the valve in position No. 2, which is the position of the elements during starting and idling of the engine;

Figure 7 is a view similar to Figure 3, showing the elements in the normal running position;

Figure 8 is a diagrammatic illustration of the control mechanism corresponding to the cranking operation illustrated in Figure 3;

Figure 9 is a view similar to Figure 8, showing the parts in the starting and idling position; and Figure 10 is a view similar to Figure 8 showing the parts in the normal running position.

Referring to Figures 1 and 2, a Diesel engine is shown at 11 provided with an air valve operating chamber 12 upon which a control valve stem 13 is journaled. This stem is operated by means of an arm 14 connected to a link 15 and tie rod 16 by means of which a plurality of valves may be operated. Link 15 is connected to a manually operated lever 17 secured to a control valve stem 18 and provided with a spring pressed positioning detent 19 which is adapted to engage recesses 20 formed upon a sector 21 carried by a control valve casing 22. The casing 22 may be mounted upon the engine 11 by means of a bracket 23 and is formed with a control valve chamber 24 within which a rotatable valve 25 is received. A spring 26 maintains the valve 25 normally against a seat 27 in order that the valve ports may register accurately with cooperating ducts to be described hereinafter.

A pipe line 28 communicates with the several valve chambers 29 within which valves 13 are received, the line 28 serving as a manifold within which the fluid under pressure is directed to the desired control valve chambers by means of which the several air valves may be actuated. The valve chambers 29 are also adapted to be connected with a discharge line 30 which serves as a drain to return the lubricant to the engine crank case.

A conduit 31 communicates with a manifold 32 formed in the valve casing 22 and also communicates, through passage 33, with a chamber 34 within which a check valve 35 is provided. Chamber 34 communicates with a chamber 36 within which a check valve 37 is provided, this valve preventing back flow of fluid from the chamber 36 into a conduit 38 which supplies oil under pressure from the oil pump of the engine. Check valve 35 prevents flow of the fluid from chamber 34 into a cylinder 39 within which a manually operated piston 40 is received, piston 40 being actuated by a manually operated lever 41 which is journaled at 42 upon an arm 43 of bracket 23.

Cylinder 39 communicates with the crank case through a suction line 44, and the piston 40, by means of the above construction, is thus adapted to direct fluid under pressure through the check valve 35 and into the pipe line 28.

Valve 25 is provided with ports 45 and 46 which communicate with passages 47 and 48, which, in turn, communicate with the manifold 32. Ports 45 and 46, respectively, also communicate with passages 49 and 50 to which conduits 51 and 52 are connected, respectively. A drain pipe 53 serves as a means by which fluid may be drained from the valve chamber 24 into the crank case, and conduits 51 and 52 communicate with a cylinder 54 within which a fluid operating piston 55 is received. Piston 55 operates a lock detent 56 which is adapted to engage a recessed fuel injector control rod 57, thus enabling the injector to be locked against operation under predetermined conditions.

It will thus be seen that the manually operated lever 41 serves as a means for supplying fluid under pressure to the pipe line 28 in order that the valve mechanism to be described hereinafter may be operated manually.

With reference to Figures 3 through 7, housing 12 is formed with a cylinder 58 within which a piston 59 is slidably received. Piston 59 is secured to a reciprocable valve stem 60 which is slidably mounted in the housing 12 and is provided with valves 61 and 62. Valve 61 is adapted to be seated upon a valve port 63, thus preventing communication between an air chamber 64 and a passage 65 giving access to a combustion chamber, not shown, (this position of the valve is illustrated in Figure 6). The valve 62 is adapted to be seated upon a port 66, preventing communication of the air chamber 64 with a chamber 67 and the atmosphere through a passage 68. (This position of the valve is illustrated in Figure 7.)

The valves 61 and 62 are further adapted to be maintained in an open position, as illustrated in Figure 3, the mechanism by means of which these valves may be controlled and operated including a rotatable valve 69 upon the valve stem 13. Valve 69 is received within a valve chamber 70 and seated against a positioning member 71 by means of a spring 72. The valve 69 is provided with a central bore 73 having a port 75 which is adapted to communicate with a passage 76 opening into the cylinder 58. Fluid under pressure is received within the bore 73 through a port 77 and passage 78 from the supply pipe 28. A second port 79 is provided in the valve 69 in order that fluid may be supplied under pressure to the opposite side of piston 59, as illustrated in Figure 7. When the mechanism is in the position shown in Figure 3, fluid under pressure is directed into the cylinder 58 through passage 76 from port 75 and bore 73, and the piston is moved to the left, as viewed in Figure 3, until a passage 80 has been closed by the valve. At such time, further motion of the piston 59 to the left is prevented because the fluid in back of the piston is trapped and cannot escape from the left hand end of the cylinder 58. Prior to reaching this position, fluid escapes from the left hand end of cylinder 58 through passage 80 and duct 81, formed in the valve 69. Duct 81 communicates with a peripheral duct 82 which is adapted to communicate with a passage 83 which communicates with the drain pipe 30.

When the valve 61 is to be seated against the port 63, the valve 69 is moved into the position shown in Figure 6, at which time an extension on the duct 81 communicates with a passage 84 and permits the fluid to escape into the drain pipe 30, as illustrated in Figure 6.

When the valve 62 is to be seated against the port 66, the valve 69 is moved into the position illustrated in Figure 7, at which time a groove 85 in the valve 69 communicates between port 76 and the peripheral groove 82, permitting the fluid within the right hand end of cylinder 58 to escape to the drain pipe 30 and establish a communication between the left hand end of cylinder 58 and the bore 73 of the valve 69 through port 79 and passage 84.

It will be seen that the valve 69 is turned to the above positions by means of the manually operated lever 17, such operation being tied in with the operation of the valve 25 in such fashion that, when the valves 61 and 62 are in the cranking position illustrated in Figure 3, the piston 55 is actuated to lock the injector control rod 57 against operation. The cylinder 58 may be closed by means of a plug 86 and the various other valve mechanisms may be secured in assembled position by plugs within which the valves may be journaled and against which they may be seated. For example, a plug 87 may be provided for the valve 69, such plug providing the seat or shoulder 71 against which the valve 69 seats, while valve 25 may be positioned by means of a fitting 88 upon which the seat or positioning member 27 may be formed.

It will be seen that the foregoing mechanism provides a means (manual lever 41, cylinder 39, piston 40, and pressure supply line 28) for supplying an actuating fluid under pressure to the plurality of cylinders 58. The control of this fluid under pressure is effected by means of the manually operated lever 17 which moves the valves 69 into the proper positions to secure the desired valve actuation. Not only does the control lever 17 effect the proper operation of the valve 69, but, simultaneously with such operation, the fuel injector locking mechanism is properly actuated through conduits 51 and 52. The number of moving parts required in the above mechanism is thus reduced to a minimum and a valve operating system provided by means of which a plurality of air chamber valves may be effectively operated from a remote position by means of mechanism which functions positively and uniformly.

While the invention has been described with reference to the specific construction shown in the accompanying drawings, it is not to be limited, save as defined in the appended claims.

I claim:

1. In a compression ignition engine having an air chamber and air chamber valve associated therewith, an air chamber valve control device comprising fluid operated means to actuate the valve, a valve to control the flow of fluid to the fluid operated means, a pipe line to supply fluid under pressure to the control valve, a source of fluid supply under pressure communicating with the pipe line, a cylinder communicating with the pipe line, a manually operated piston in the cylinder, and remote manually operated means to actuate the control valve.

2. In a compression ignition engine having an air chamber and air chamber valve associated therewith, an air chamber valve control device comprising fluid operated means to actuate the valve, a valve to control the flow of fluid to the fluid operated means, a pipe line to supply fluid under pressure to the control valve, a source of fluid supply under pressure communicating with the pipe line, a cylinder communicating with the pipe line, check valves between the cylinder and pipe line and between the source of fluid supply and the pipe line, a manually operated piston in the cylinder, and remote manually operated means to actuate the control valve.

3. In a compression ignition engine having an air chamber, an air chamber valve associated therewith, and a fuel injector control rod, an air chamber valve and injector control rod controlling device comprising injector control rod locking mechanism, fluid operated means to actuate the valve, a first valve to control the flow of fluid to the fluid operated means, a pipe line to supply fluid under pressure to the control valve, a source of fluid supply under pressure communicating with the pipe line, fluid operated means to actuate the locking mechanism, a pipe line to supply fluid under pressure to the last named fluid operated means, a second valve to control the flow of fluid in the last named pipe line, and common manually operated means for actuating the first and second valves.

4. In a compression ignition engine having an air chamber and air chamber valve associated therewith, an air chamber valve control device comprising fluid operated means to actuate the valve, a valve to control the flow of fluid to the fluid operated means, a pipe line to supply fluid under pressure to the control valve, a source of fluid supply under pressure communicating with the pipe line, a starting motor switch, and common manually operated means to actuate the control valve and the starting motor switch.

BRUNO LOEFFLER.